July 25, 1944. W. F. STAHL 2,354,556
METHOD OF FORMING LAMINATED TUBULAR BODIES
Filed June 9, 1941 3 Sheets-Sheet 1
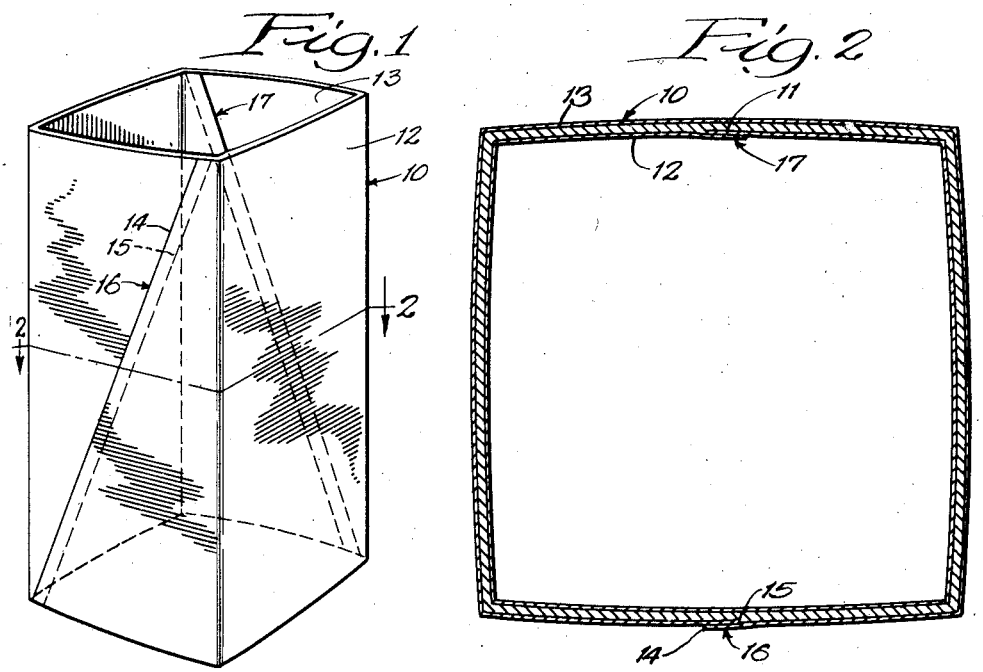
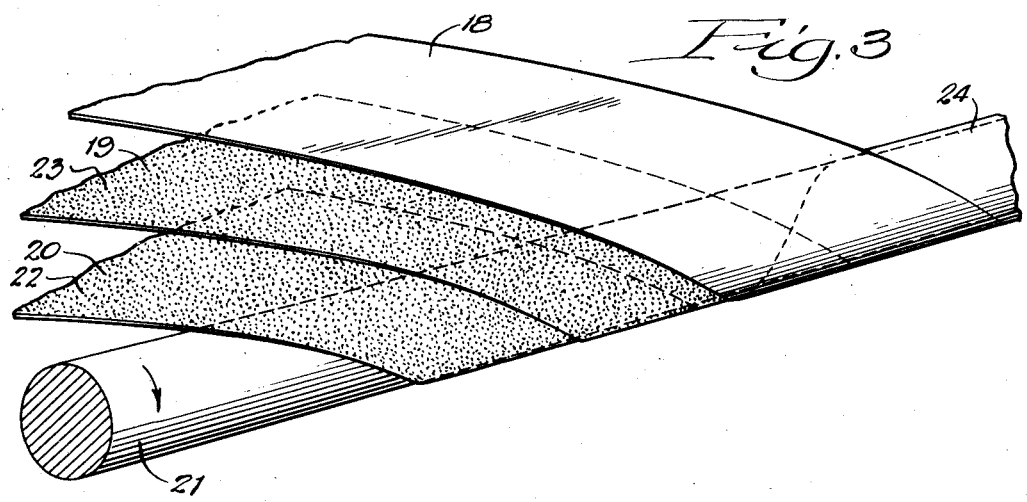
Inventor.
William F. Stahl,
By Dawson, Ooms & Borth,
Attorneys.

July 25, 1944. W. F. STAHL 2,354,556
METHOD OF FORMING LAMINATED TUBULAR BODIES
Filed June 9, 1941 3 Sheets-Sheet 2
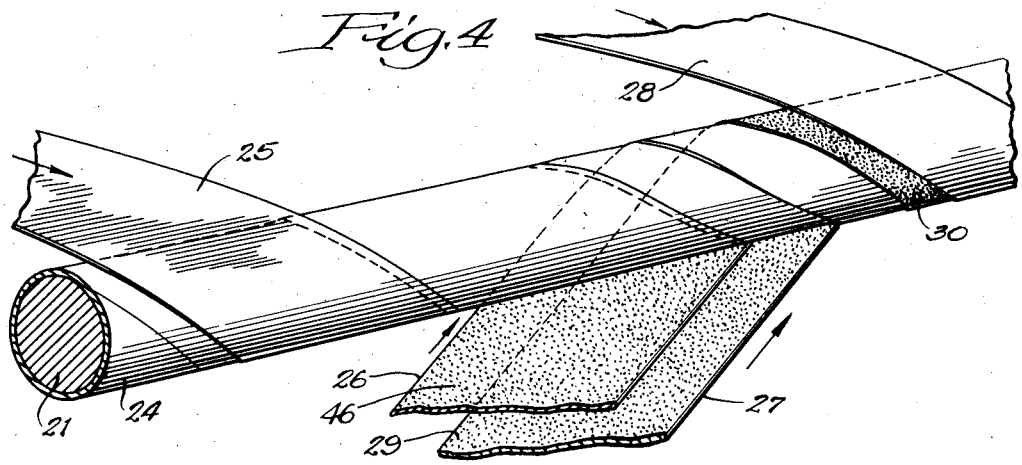
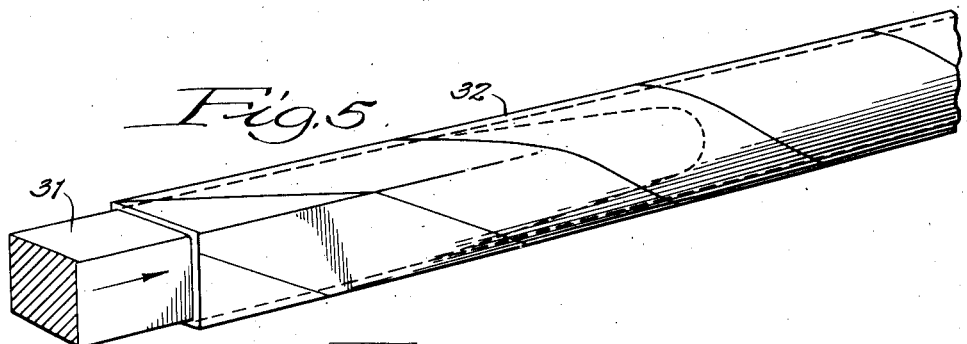
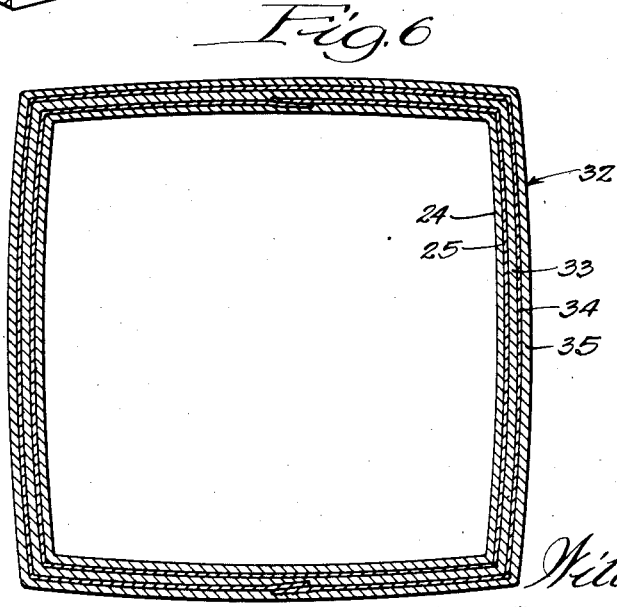

July 25, 1944.　　　W. F. STAHL　　　2,354,556
METHOD OF FORMING LAMINATED TUBULAR BODIES
Filed June 9, 1941　　　3 Sheets-Sheet 3
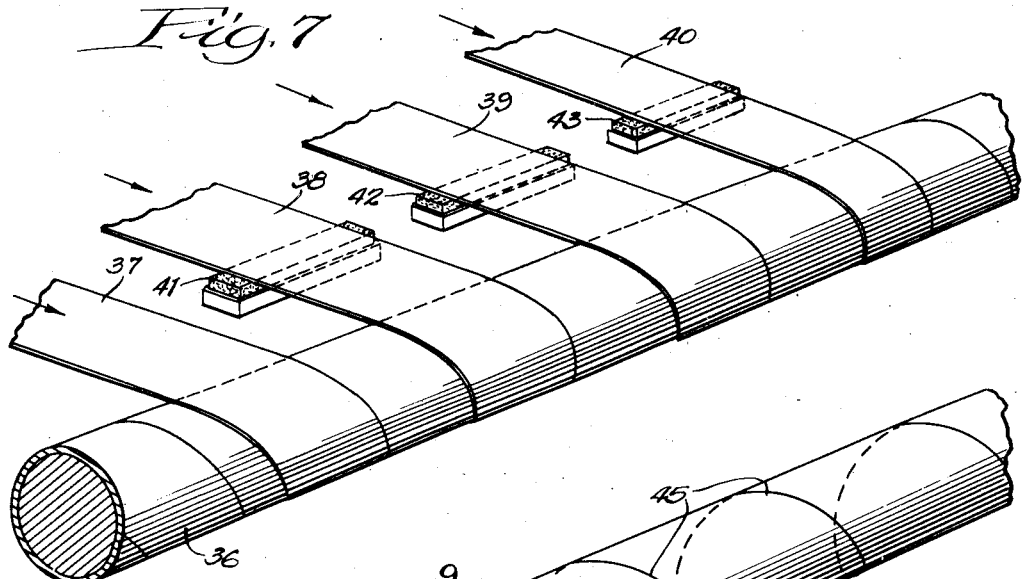
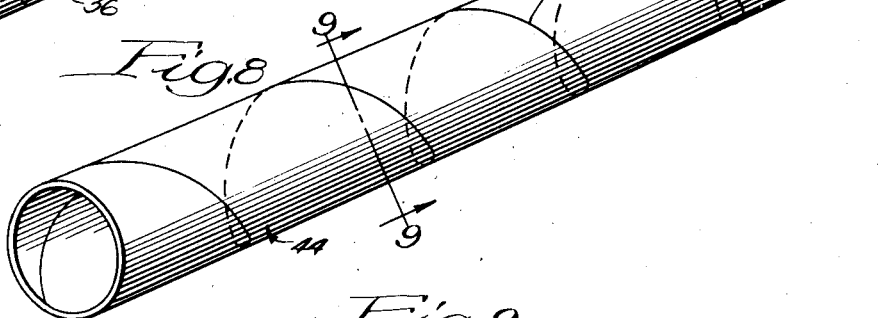
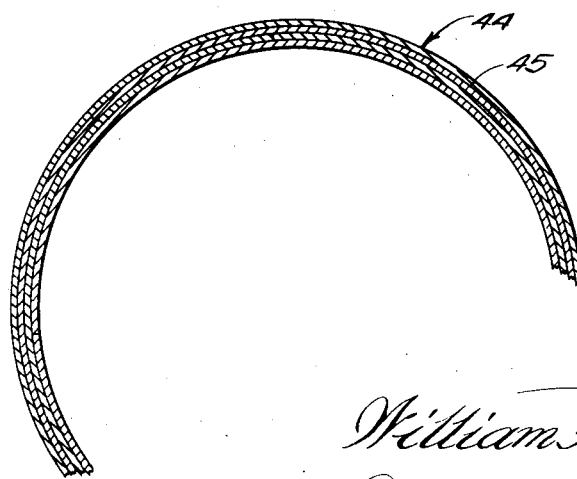
Inventor:
William F. Stahl,
By Dawson, Coms & Booth,
Attorneys.

Patented July 25, 1944

2,354,556

UNITED STATES PATENT OFFICE 2,354,556

METHOD OF FORMING LAMINATED TUBULAR BODIES

William F. Stahl, Evanston, Ill.

Application June 9, 1941, Serial No. 397,198

4 Claims. (Cl. 93—94)

This invention relates to laminated tubular bodies and method of forming the same, and more particularly to tubular constructions in which a plurality of thin, flexible sheets of material are spirally wound around a base in overlapping layers.

An object of the invention is to provide a self-sustaining and collapsible base for the spiral winding of sheets of material. Another object is to spirally wind on a base a plurality of thin, flexible sheets of material which individually are not self-sustaining, but when spirally wound together in overlapping relation and secured to each other, are adapted to form a self-sustaining tube. From this tube, the base may be collapsed and removed. Still another object is to provide a tube of thin metal foil with the foil spirally wound about a self-sustaining base which may be collapsed and removed when a tubular structure has been formed thereabout. The metal foil tube is adapted to be used as a shield for high frequency electrical currents and is provided with a seam oblique to the axis of the tube and extending less than one revolution about the tube.

Another object of the invention is to form a laminated product about a tubular base with successive layers of sheet material spirally wound about the base. Yet another object is to provide a tubular body of metal foil carried on a supporting base which is collapsible and removable and provided with a protective layer about the outside of the foil. The product may be subjected to shaping or forming or other treating operations, and the supporting base and the protective outer layer thereafter removed therefrom. A further object is to simultaneously wind a thin sheet of metal foil, together with a layer or layers of protective material about the base to form a laminated tubular product in which the protective material is disposed about the foil.

Other features and advantages of the invention will appear from the following specification and drawings, in which:

Figure 1 is a perspective view of a tubular shield formed in accordance with the invention; Fig. 2 is a transverse sectional view taken along the line 2—2 of Fig. 1; Fig. 3 is a perspective view of a plurality of strips of material being wound about a mandrel; Fig. 4 is a perspective view of strips of protective material and metal foil being simultaneously wound about a tubular base; Fig. 5 is a perspective view of a mandrel in the process of shaping a tubular product; Fig. 6 is a transverse sectional view of a laminated tubular product made in accordance with the invention; Fig. 7 is a perspective view of a plurality of strips of material being applied to a paper base on a mandrel; Fig. 8 is a perspective view of the product formed by the operation of Fig. 7; and Fig. 9 is a fragmentary detail transverse sectional view of the product shown in Fig. 8.

In the use of high frequency electrical currents in radio apparatus and the like, it is desirable and often necessary to provide electrically conducting shields about the sources of high frequency current. The conducting shields serve to intercept and dissipate the electro-magnetic and electro-static fields set up by the current. In radio apparatus and the like, tubular devices of solid metal have usually been used for this purpose. However, such devices are expensive, heavy, and often difficult to obtain. The tubular bodies formed of metal foil in accordance with the present invention may be used as shields for this purpose and are effective to intercept and dissipate the electro-motive and electro-static fields of force set up by the currents. The metal foil is wound in spiral form about a tubular base to provide a product in which the base is substantially completely covered by the metal foil. The tubular product may cut to any suitable length. In the length of the tube forming the shield, the foil is spirally wound with the edges of the sheets in slightly overlapping relation forming a seam oblique to the axis of the tube, the seam extending less than one revolution about the tube. In this way, a substantially continuous shield is provided, while at the same time spiral winding of the foil does not provide a coil which will set up inductance currents.

The metal foil may be spirally wound with other material which will serve to support the same and the product may be formed as a laminated structure in which are provided successive layers of foil and paper or other similar material. The structure may be used for many purposes, but is particularly suitable for use as an electrical shield. The same method may be used to form tubular bodies of other materials, the products being used for many varied purposes.

In the specific embodiment of the invention described herein, and referring particularly to Fig. 1 and Fig. 2 of the drawings, a tubular body 10 of rectangular cross-section is composed of a paper base 11 and layers of copper or other metal foil 12 and 13 on the inner and outer sides thereof. The copper foil is used in wide sheets which are spirally wound about the base 11 with the edges 14 and 15 of the sheet 13 slightly overlapping to form a seam 16, which extends along the outer surface of the base and is oblique with respect to the axis of the tubular base. Similarly, the seam 17 is formed on the inside of the tubular base by the overlapping of the edges of the sheet 12.

In the forming of tubular bodies of metal foil or other material, it is desirable to provide a base upon which the sheets of material may be wound.

The base should be self-sustaining and is, at the same time, preferably collapsible in order that it may be removed from the material after it has been formed into a tubular product. Referring particularly to Fig. 3, the base may be formed of a plurality of strips of paper 18, 19 and 20, which are spirally wound about the mandrel 21. The paper strips may be of any suitable character. Preferably all of the strips except the upper one are provided with adhesive on the upper surface thereof. Thus the strip 20 is provided with an adhesive layer 22, and the strip 19 is provided with an adhesive layer 23. For this purpose it is usually desirable to use gummed tape of the usual and well-known character.

When the strips of paper are wound about the mandrel 21, the adhesive surfaces of the paper are moistened so that each of the strips will be secured to the next adjacent strip. The strips are spirally wound in overlapping relation to form an integral paper tube 24 (Fig. 4). It will be noted that the outer and inner surfaces of the tube are not coated with adhesive.

The paper tube which is formed by spirally winding a plurality of paper strips in overlapping relation is substantially rigid and self-sustaining. This tube serves as a base for the spiral winding of the thin sheets of metal foil or other material. The tube 24 is, at the same time, collapsible and may readily be removed from the material wound upon it after the material is formed into an integral tubular body.

Upon the tubular paper base 24 is wound a strip or sheet of thin metal foil 25, together with a plurality of strips or sheets of paper 26, 27 and 28, as seen particularly in Fig. 4. The strips are spirally wound in overlapping relation with each of the strips extending across a portion of the next adjacent strip, and each of the strips being so wound that the lateral sides or edges of the same slightly overlap the edges of the same strip on the next revolution of the spiral winding. The paper is provided with adhesive which secures each of the strips of paper to the next and also secures the first strip of paper to the outer surface of the strip of metal foil. If desired, this result may be accomplished, as shown, by providing the strip 27 with adhesive or glue on each of the sides thereof and by providing an adhesive layer on one of the sides of the strip 26. The strips 25, 26, 27 and 28 are simultaneously wound upon the tubular base 24. The adhesive layers 29 and 30 on the strip 27 and the adhesive layer 46 on the strip 26 are moistened immediately before the strip is applied so that each of the strips is secured to the next adjacent strip and the lower strip is adhesively secured to the outer surface of the strip 25 of metal foil.

The product of this operation is a tubular paper base with a layer of metal foil spirally wound about the same with the edges of the foil slightly overlapping each other to provide substantially complete coverage of the outer surface of the paper tube. About the foil is thus formed an integral protective tube of a plurality of layers of paper.

If desired, this product which includes a paper tube, a layer of metal foil, and a second paper tube about the metal foil, may be subjected to the same operation to provide an additional layer of metal foil and paper. The operation may be exactly the same as that described in connection with Fig. 4, except that the laminated product will be substituted as a base for the paper tube 24.

A second sheet of copper or other metal foil is spirally wound about the laminated product as a base and is preferably secured to the outer paper surface of the laminated product. An adhesive may be applied to the outer paper surface or to the inner surface of the copper foil in order to secure the same in position. Simultaneously, a layer of paper strips is spirally wound about the laminated product as a base with the strips being applied immediately outside the layer of copper foil. The paper strips may be secured to each other, but not secured to the second layer of copper foil about which they are wound. The final product includes a tubular paper base, a layer of copper or other metal foil thereabout, a layer of paper strips forming a tubular paper body extending about the metal foil and adhesively secured thereto, a second layer of metal foil, and finally, a tubular paper layer about the second layer of metal foil.

The laminated product may be subjected to shaping or forming operations if desired. When the tubular body is to be used as a shield for high frequency electrical currents, it is often desirable that it be rectangular in cross section. In this event, a rectangular mandrel 31 of suitable size and shape and provided with a bevelled end 32 which is readily received within the circular tube may be inserted within the laminated tube 32 and forced through the tube to change the shape of the tube to rectangular in cross section. Preferably, a rectangular die (not shown) is placed about the tube and the mandrel in order to aid in shaping the tube. The laminated tubular product of rectangular cross section is shown in Fig. 6. The tubular body 32 is provided with an integral tubular base 24, a layer of copper foil 25, an integral tubular layer of paper 33, a layer of copper foil 34, and an outer protective layer of paper 35.

The tubular paper base 24 may be removed from the product by collapsing the same. If desired, suitable members or means may be inserted between the base 24 and the layer of copper foil 25 to separate the same. The base 24 may then be removed from the body 32. The outer protective layer of paper 35 may also be removed from the tubular body 32 in any suitable manner. It will be noted that the layers of copper or metal foil 25 and 34 are adhesively secured to the tubular paper body 33, but not to the paper base 24 or the paper layer 35. When the paper base 24 and the outer protective layer of paper 35 are removed from the tubular body 32, the shield 10 shown in Fig. 1 is obtained.

A similar method may be used in forming tubular bodies of other material. For example, integral tubular bodies of plastics and synthetic resins may be formed by spirally winding strips or sheets of the material in overlapping relation about a self-sustaining, but collapsible base. The strips and sheets may be secured to each other to form an integral structure and the base may thereafter be removed.

Instead of paper strips, thin sheets of any suitable material may be used in the forming of the laminated tubular bodies. Preferably, however, the material should be a light weight, non-conducting material of a cellulosic character.

The tubular base and the laminated body formed thereabout may be rectangular instead of circular in cross section, and the sheets of material may be spirally wound about the base in the same manner as in the case of the circular cross section base shown and described. When a tubular base of rectangular cross section is used, the outer protective layer of paper or the like serves to protect the metal foil in the winding operation. For this reason, the protective layer should be applied simultaneously with the layer of metal foil.

When the tubular body is to be used as a shield for high frequency electrical currents, the seam formed by the overlapping edges of the sheet of metal foil should extend less than one revolution about the body for the length of tubing to be used. In this way the setting up of inductance currents in the shield is avoided. Accordingly, although the laminated tubular body may be formed in any suitable or desired length, the body should be cut to a length in which the seam will not extend a complete revolution about the same. Thus, if a long or large shield is to be used, the metal foil from which the body is formed should be in wide sheets which, when spirally wound, will provide a tubular body with a seam oblique to the axis of the base which does not extend completely about the body.

As seen particularly in Fig. 7, a paper tube 36, similar in construction to the tube 24, is used as a base. Strips 37, 38, 39 and 40 of cellulose acetate, ethyl cellulose, or other suitable plastic or resin may be spirally wound upon the paper base with each of the strips in overlapping relation. The resinous material may, if desired, be transparent and will in this event provide a transparent tubular body as the product. Preferably, the strips are secured to each other by applying a solvent to the adjacent surfaces. For example, pads 41, 42 and 43, moistened with a suitable solvent, may be brought into contact with the lower surface of the strips 38, 39 and 40 respectively. When the strips are passed over the pads and receive the solvent therefrom, they become adhesively secured to the upper surface of the next adjacent strip when wound upon the base. After the strips have been spirally wound upon the base 36, they form an integral tubular body of a plurality of overlapping strips which are secured to each other. The strips are wound in overlapping relation, with each strip overlapping a portion of the next adjacent strip. The opposed edges of the strips, however, preferably do not overlap each other, but merely abut each other to form a seam which is not raised above the level of the main portion of the strip. The paper base may then be collapsed and removed from the tubular body 44, which is integral and self-sustaining.

By reason of the successive layers of the sheets of resin or plastic which are applied, a strong, sturdy body is obtained from thin plastic sheets. The seams formed by the joining of the edges of the sheets are completely covered except for the seam 45, formed by the outer sheet or strip.

The term "tubular" is used herein in its broad sense and is intended to include hollow, sleeve-like bodies of circular, rectangular, or other cross section construction.

While there are shown and described certain embodiments of the invention and certain steps in the forming of the product, it is understood that the invention is capable of many modifications. Changes, therefore, in the construction and arrangement of the product and in the steps of forming the same may be made without departing from the spirit or scope of the invention, as disclosed in the appended claims.

I claim:

1. A method of forming laminated tubular bodies comprising, providing a tubular base, spirally winding a thin sheet of metal foil about the base with the edges of metal foil in over-lapping relation forming a substantially complete covering for the outside surface of the base, spirally winding a plurality of thin sheets of non-conducting material about the metal foil in over-lapping relation with each other and secured to each other, the innermost sheet being secured to the outer surface of the metal foil, spirally winding a thin sheet of metal foil about said non-conducting material and securing the foil thereto, and simultaneously winding at least one protective sheet about the outer layer of foil, removing the base, and removing the outer protective sheet.

2. A method of forming laminated tubular bodies comprising, providing a tubular paper base, spirally winding a thin sheet of copper foil about the base with the edges of the sheet of foil in over-lapping relation forming a substantially complete covering for the base, simultaneously spirally winding a plurality of thin sheets of paper in overlapping relation about the copper foil and adhesively securing the sheets to each other and the innermost sheet to the foil to form an integral tubular layer, spirally winding a second sheet of thin copper foil about the tubular layer with the edges of the foil in over-lapping relation and adhesively securing the foil to the outer surface of the tubular layer, simultaneously spirally winding a plurality of protective paper sheets about the outer sheet of copper foil, collapsing the tubular paper base and removing the same from the body, and removing the protective paper sheets.

3. A method of forming laminated tubular bodies comprising, providing a tubular base of circular cross section, spirally winding a thin sheet of metal foil about the base with the edges of the sheet in over-lapping relation whereby the outer surface of the base is substantially completely covered, winding a plurality of thin sheets of non-conducting material about the metal foil and securing the sheets thereto, spirally winding a thin sheet of metal foil about the non-conducting material with the edges of the foil in over-lapping relation, simultaneously winding a plurality of protective sheets about the outer layer of copper foil, forming the laminated tubular product into a tubular body of rectangular cross section, removing the tubular base, and removing the outer protective sheets.

4. A method of forming laminated tubular bodies comprising, spirally winding a plurality of strips of gummed tape in tubular form and securing the strips to each other to provide an integral tubular paper base, spirally winding a thin sheet of copper foil about the base with the edges of the sheet of foil in over-lapping relation forming a substantially complete covering for the base, simultaneously spirally winding a plurality of thin sheets of paper in over-lapping relation about the copper foil and adhesively securing the sheets to each other and the innermost sheet to the foil to form an integral tubular layer, spirally winding a second sheet of thin copper foil about the tubular layer with the edges of the foil in over-lapping relation and adhesively securing the foil to the outer surface of the tubular layer, simultaneously spirally winding a plurality of protective paper sheets about the outer sheet of copper foil, collapsing the tubular paper base and removing the same from the body, and removing the protective paper sheets.

WILLIAM F. STAHL.